United States Patent Office 3,811,993
Patented May 21, 1974

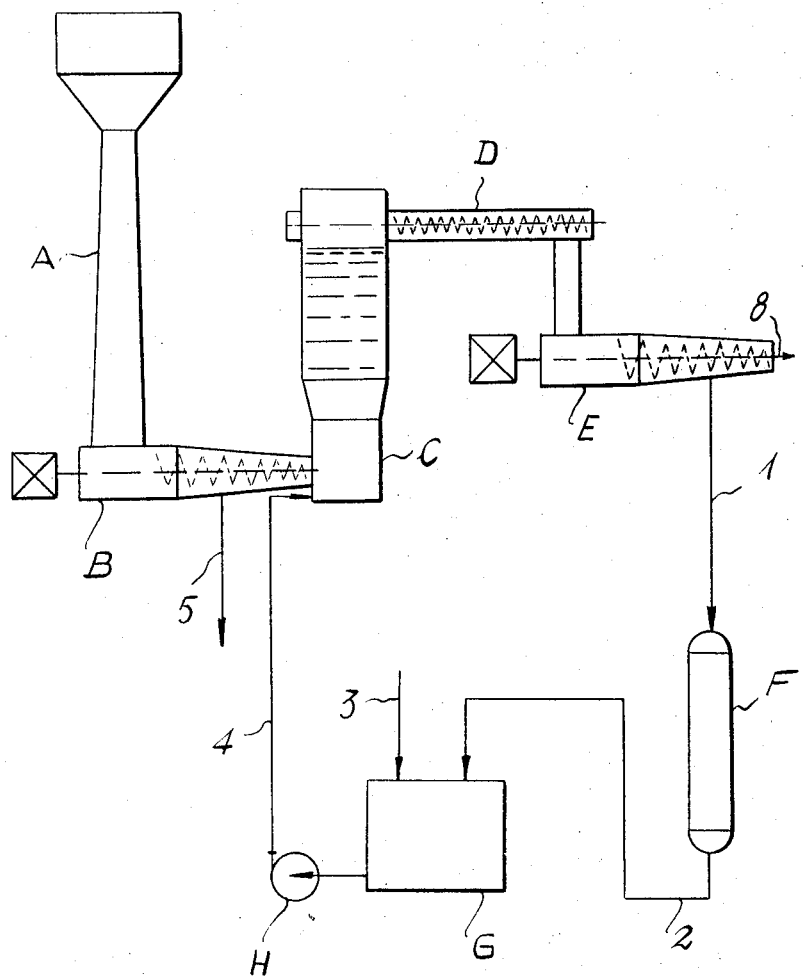

3,811,993
SYSTEM TO AVOID THERMAL DEGRADATION OF CHEMICAL COMPOUNDS DURING THE TREATMENT OF WOOD CHIPS
Pietro Ghisoni, Brezzo di Bedero, Italy, assignor to Vita Mayer & C. gia F. Lli Vita S.a.s., Milan, Italy
Filed July 7, 1972, Ser. No. 269,751
Claims priority, application Italy, July 10, 1971, 26,881/71
Int. Cl. D21c 3/24, 3/26
U.S. Cl. 162—18                                1 Claim

ABSTRACT OF THE DISCLOSURE

A system to avoid the decomposition of thermo-degradable compounds such as sodium borohydride used in the treatment of ligincellulosic material for the production of a high brightness and high yield pulp for use in paper making. Wet chips of lignincellulosic material are pressed to reduce the water content. The pressed chips are passed into an impregnation chamber which contains an alkaline solution and then are pressed a second time and the expressed liquid is recovered. Pressing raises the temperature of the liquid which is then cooled and is recirculated to the impregnation chamber. Compounds absorbed by the chips are added to the recovered liquid as it flows from the cooling station to the impregnation chamber.

---

This invention concerns a system to avoid the thermal degradation of some chemical compounds during the treatement of wood chips in the production of pulp for use in paper.

The system of this invention is particularly suitable for the method described in Italian Pat. No. 869,265 in the name of the assignee of the present applicant which described the production of pulp from wood chips by treating with sodium borohydride.

The fibrous material, i.e., the wood chips, have to be treated with a chemical product with a maximum recycling of the chemical product. The chips treated with the above mentioned compounds are mechanically squeezed in order to recover a part of the liquor used for the impregnation of the fibrous material. The liquor recovered is recycled.

The squeezing is made by some screw presses which are able to work in the following way:

dry content of the material before the squeezing 30%,
dry content after the squeezing 50%.

At the inlet of the press, for each weight unit of the dry fibrous material there are 2.3 parts of impregnating liquor, while at the outlet there is only one part.

The liquor recovered from the press is, in this case, 1.3 parts with respect to the dry fibrous material.

The recovery by pressing of the impregnation liquor requires a large quantity of power. The greater part of this power is transformed into sensible heat in the impregnation liquor.

There are some chemical compounds which, because of their instability, cannot be heated beyond certain temperatures, above which the compound is rapidly decomposed.

For instance, the sodium borohydride used in the treatment of the chips, as is described in the aforesaid patent of the same applicant, is stable in alkaline solution at a temperature not higher than 50° C. An object of the present invention is to realize a system which avoids the recycling liquor reaching a temperature so high as to cause the decomposition of some compounds.

According to the present invention, a system that allows the attainment of the above mentioned purpose and some other ones that will be better described later, consists in cooling the recovered liquor before the recycling step in order to avoid a dangerous increase in temperature.

The invention will be better understood from the following detailed description which gives (just as an example and therefore non-limiting) the preferred ways among the different ones. This way is schematically described in the enclosed drawing showing a plant for the treatment of the wood chips with a liquor containing an alkaline solution of sodium borohydride.

The values in the following description refer to the quantity, by weight, necessary to obtain a ton of ready product and, in this case, of pulp for use in paper.

The wet chips, at a dry content of 30%, are fed in a conventional way into the bin A from which they go into a screw press B in which they are squeezed a first time until they reach a dry content of about 50%.

The chips are then fed into the bottom of the vessel C which contains the impregnating liquor constituted by an alkaline solution of sodium borohydride.

The chips swell during their upward passage in the vessel C (which has a constant level of liquor) and are impregnated with the liquor itself which is fed to the bottom of the vessel C by the pipe 4 and the pump H (which sucks the liquor from the tank G).

The chips reach the top of the vessel C with a dry content of about 30%. The screw conveyor D transports the chips to a second press E in which the chips are squeezed a second time. Here the chips, squeezed to a dry content of 50% are discharged from the screw press at 8 into the next vessel in which they are further processed, according to the treatment described in the aforementioned patent of the applicant.

The recovered liquor from the press E flows through pipe 1 to the heat transfer vessel F where the liquor is cooled. At the outlet of such heat transfer F, a pipe 2 conveys the liquor to the tank G. A pipe 3 connected to the tank G supplies additional liquor to compensate for the liquor consumed in the system. For the production of a ton of pulp, 3180 kg. of chips having a dry content of about 30%, i.e., the weight of the dry chips is about 1060 kg. and the rest is water, are necessary in the bin A.

About 1060 kg. of water are discharged from the press B through the conduit 5 and the squeezed chips, which flow into the impregnation vessel C from the screw press B, will be about 2120 kg. with a dry content of about 50%, i.e., about 1060 kg. will be dry chips and about 1060 kg. will be water. The chips coming out of the press B and going into the impregnating vessel C absorb a given quantity of liquor which decreases their dry content from about 50% to about 30%. In this way, the total liquid content in the chips will be about 2000 kg.: about 1000 kg. of the liquid content come with the chips as they come out of the press and the other approximately 1000 kg. come from the added liquor and are absorbed during the expansion.

The screw conveyor D feeds the impregnated chips to the screw press E from which, through the pipe 8, the material, again squeezed, comes out at a dry content of about 50%, i.e., about 1060 kg. of dry chips and about 1000 kg. of liquor. The pipe 1 will bring the recovered liquor containing 1000 kg. of water, 80 kg. of NaOH, and 2 kg. of sodium borohydride into the heat exchange F at a temperature of 52° C. This liquor will be cooled in the heat exchange F, taking out some heat corresponding to about 22,000 Calories, so as to have at the outlet a liquor at a temperature of about 30° C.

A liquor containing 93 kg. of water, 80 kg. of NaOH and 2 kg. of sodium borohydride will flow into the tank G through the pipe 3. The pump H feeds a solution containing 1093 kg. of water, 160 kg. NaOH and 4 kg. of sodium borohydride through the pipe 4 into the vessel C.

Although only one way of realizing the present invention has been described, it will be understood that changes and variations may be made by those skilled in the art without departing from the spirit and scope of the appended claim.

I claim:

1. A system to avoid the decomposition of thermodegradable compounds used in the treatment of lignincellulosic material for the production of a high brightness and high yield pulp for use in paper making comprising in sequence:

pressing wet chips of lignincellulosic material, having a water content of about two-thirds by weight, with sufficient pressure until the water content thereof is reduced to about one-half by weight, impregnating the pressed chips with an alkaline solution, in which sodium borohydride is present in an amount of about 0.318% by weight of the impregnating solution, until the chips have a liquid content of about two-thirds by weight, pressing the impregnated chips a second time with sufficient pressure until the liquid content thereof is reduced to about one-half by weight, and the temperature is increased to about 52° C.

recovering the liquid released in the second pressing operation, cooling the recovered liquid to about 30° C., adding to the cooled liquid an alkaline solution containing sufficient sodium borohydride in an amount which, together with the amount of sodium borohydride in the cooled liquid, will replenish the sodium borohydride absorbed in the chips, recycling the cooled liquid having the added alkaline solution therein to the impregnation chamber, and performing all of the foregoing steps in a continuously operating system.

References Cited

UNITED STATES PATENTS

| | | | |
|---|---|---|---|
| 2,771,361 | 11/1956 | Birdseye et al. | 162—56 X |
| 2,224,135 | 12/1940 | Boehm | 162—56 X |
| 3,042,575 | 7/1962 | Hartler | 162—80 |
| 3,284,283 | 11/1966 | Kindron et al. | 162—80 X |
| 3,354,029 | 11/1967 | Hartler et al. | 162—80 X |
| 3,078,208 | 2/1963 | Cederquist et al. | 162—84 X |

ROBERT L. LINDSAY, JR., Primary Examiner

A. L. CORBIN, Assistant Examiner

U.S. Cl. X.R.

162—56, 80